June 18, 1935.  F. A. VOLZ  2,005,668
COILABLE MEASURING RULE
Filed Feb. 8, 1933
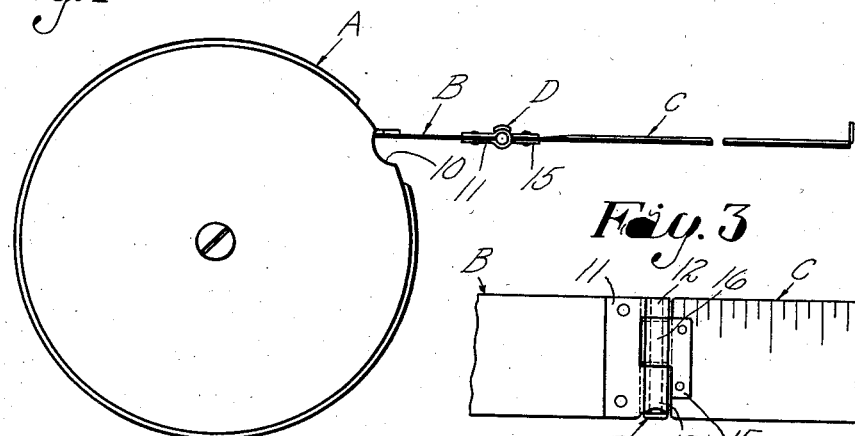
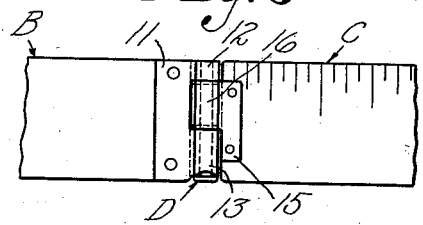
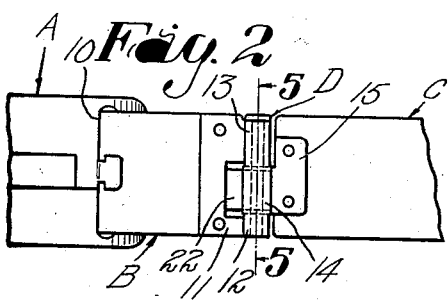
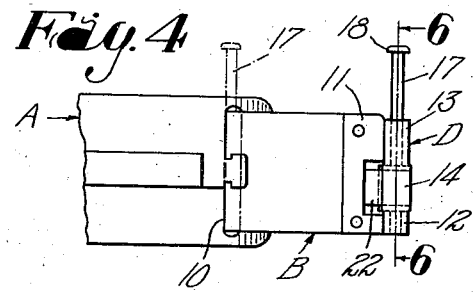
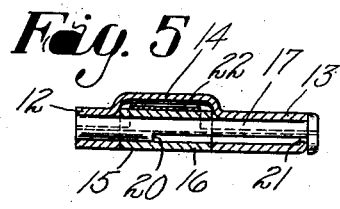
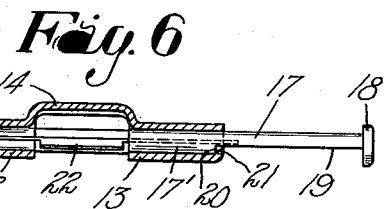
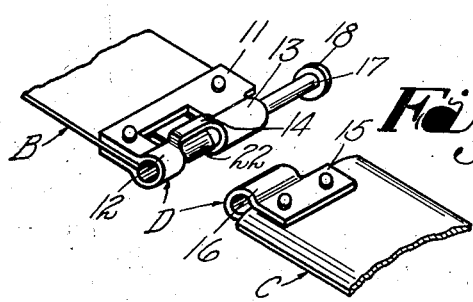
Inventor
*Frederick A. Volz*
By *N. Clay Lindsey*
Attorney Patented June 18, 1935

2,005,668

UNITED STATES PATENT OFFICE 2,005,668

COILABLE MEASURING RULE

Frederick A. Volz, New Britain, Conn., assignor to The Stanley Works, New Britain, Conn., a corporation of Connecticut Application February 8, 1933, Serial No. 655,685

4 Claims. (Cl. 33—138)

The present invention relates to coilable measuring devices of the type having a casing and a measuring tape adapted to be wound therein, and has particular reference to means for readily detaching and attaching the tape to the instrumentality for winding or coiling the tape into the casing. The improvements of the present invention are especially applicable to that type of measuring device in which the measuring tape is in the form of a strip of metal having a concavo-convex form so that when extended it will automatically assume a rectilinear shape or straight rod-like form, and the winding instrumentality for said tape may be in the form of a resilient strip which approximately balances the resistance of friction and the tendency of the measuring tape to resist bending.

It is an object of the present invention to provide in a device of this kind an improved readily detachable connection between the measuring member and the winding member therefor. In accordance with the present illustrated disclosure, alined knuckles are carried by said members, and one of said members supports a pin adapted to be longitudinally moved into a connecting position in which it is received by all of said knuckles and to an anchoring position in which it is free of the knuckle on one of said members.

The invention also has for an object to provide an improved device of this character in which one of the elements of the detachable connection between the resilient strip and the measuring tape also acts as an anchor for preventing the loss of the resilient strip within the holder, and means are also provided for positively holding this anchoring element in its anchoring position and also in its connecting position.

Another object of the present invention is to provide an improved device of this character which comprises relatively few parts, is of simple construction, is cheap to manufacture, and is rapid and sure in operation.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown, for illustrative purposes, one embodiment which the present invention may take, Fig. 1 is a side view of a measuring device constructed in accordance with the present invention;

Fig. 2 is a top plan view of the same;

Fig. 3 is a bottom plan view of the connecting means between the outer end of the resilient strip and the inner end of the measuring tape;

Fig. 4 is an edge view of the casing showing one part of the detachable connection in position for preventing the loss of the resilient strip within the holder;

Fig. 5 is a sectional view taken on the line 5—5 of Fig. 2;

Fig. 6 is a sectional view taken on the line 6—6 of Fig. 4; and

Fig. 7 is a perspective view of my improved connecting means in disconnected relation.

Referring more particularly to the drawing, A generally indicates a casing or holder, B a winding or tensioning means for winding a measuring tape C into the holder, and D generally indicates my improved connecting means between the strip B and tape C. The holder A may be of the usual construction employed in a device of this character and is provided with an entrance opening or slot 10 in one peripheral wall thereof. The tensioning means B may be in the form of a resilient strip of metal and may be of the type such as to approximately balance the resistance of friction and the tendency of the measuring tape to resist bending, or it may have sufficient tension to overcome the resistance of friction and the resistance of the measuring tape to bend. In the present disclosure, the tensioning means B may be of the former type and may be secured within the casing in the usual manner.

The measuring tape C may be formed from a strip of metal having a concavo-convex form so that when extended it will automatically assume a rectilinear shape or straight rod-like form. The resilient strip B and measuring tape C may be detachably joined together by means of the connection D which comprises a clip 11 folded over upon itself and between the folds of which is interposed the outer end of the resilient strip B. The clip 11 may be secured to the resilient strip B in any suitable manner and is provided with a pair of spaced apart knuckles 12 and 13 between which extends a raised bridge 14. A clip 15 is secured to the inner end of the measuring tape C in any suitable manner, and is provided with a knuckle 16 adapted to be received by the space between the knuckles 12 and 13 of the clip 11 and disposed in alinement therewith when the resilient strip B and the measuring tape C are joined together.

In order to maintain the knuckles 12 and 13 of the clip 11 and the knuckle 16 of the clip 15 in assembled relation, a pin 17 is provided. This pin 17 is adapted to be slidably received by the knuckles 12, 13 and 16 and is provided with a head 18 at one end thereof. The shank of the pin 17 is provided with a rounded surface 17' which provides a good bearing surface for the knuckles to pivot upon. The shank of the pin is also provided with a flat 19 adjacent its head 18 whereby a shoulder 20 is provided which cooperates with an abutment 21 provided at the outer end of the knuckle 13 of the clip 11. With this arrangement, it is apparent that the movement of the pin 17 in the knuckles 12, 13 and 16 is limited in both directions.

For the purpose of holding the pin 17 in either of its extreme positions, a spring 22 is provided. This spring 22 may be formed integral with the outer end of the resilient strip B, being of such a width that it is capable of being received by the space between the knuckles 12 and 13. When the strip B and the measuring tape C are connected together, the spring 22 is confined between the bridge 14 and the knuckle 16 of the clip 15 and resiliently urges the knuckle 16 into frictional engagement with the shank of the pin 17 which is in turn urged into frictional engagement with the knuckles 12 and 13 so that the pin 17 is frictionally held against longitudinal movement in the knuckles 12, 13 and 16 and yet the knuckles may pivot on the shank of the pin. When the pin 17 has been withdrawn to its anchoring position, as shown in Figs. 4, 6 and 7 and wherein the pin is clear of the knuckles 12 and 16, and the knuckle 16 of the clip 15 is withdrawn from the space between the knuckles 12 and 13 of the clip 11, the spring 22 will occupy the space between the knuckles 12 and 13 and will be disposed in the path of longitudinal movement of the pin 17 so that the latter will be prevented from being accidentally moved inwardly out of anchoring position.

In the use of the device, the measuring tape C and the strip B may be withdrawn from the holder A to a position in which access may be had to the connection D. The head 18 of the pin 17 may be then engaged by a thumb or finger of the user of the device and drawn outwardly until the pin is moved clear of the knuckles 12 and 16. Further outward movement of the pin 17 will be prevented by the engaging of the shoulder 20 of the pin 17 against the abutment 21 of the knuckle 13. The measuring tape C may now be disconnected from the resilient strip B by removing the knuckle 16 from between the knuckles 12 and 13. When this is done, the spring 22 will move to a position in which it occupies the space between the knuckles 12 and 13 and will be disposed in the path of longitudinal movement of the pin 17 so that the pin 17 may not be accidentally pushed inwardly out of anchoring position. As may be seen from the dotted line position in Fig. 4, the pin 17 will engage the adjacent side of the casing A at one side of the opening 10 so that the resilient strip B will be prevented from becoming lost by being drawn into the casing A.

When it is desired to connect the measuring tape C with the resilient strip B, the knuckle 16 of the clip 15 is inserted between the knuckles 12 and 13 of the clip 11 against the force of the spring 22. When the knuckle 16 has been lined up with the knuckles 12 and 13, the pin 17 may then be pushed inwardly so as to pass through the knuckles 12, 13 and 16. It will be noted that in this assembled relation of the parts the spring 22 will be confined between the bridge 14 and the knuckle 16 and will yieldingly urge the knuckle 16 into frictional engagement with the pin 17, as described above, so that the pin 17 will be frictionally held against longitudinal movement and the measuring tape C will be securely and yet detachably connected to the resilient strip B. It will be observed that a readily detachable connection is provided between the resilient strip B and the measuring tape C in which one of the elements of the connection is positively held in its anchored position and in its connecting position.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a holder, a measuring tape adapted to be coiled therein and having a knuckle on one end thereof, a resilient strip within said holder for coiling said tape and having a pair of spaced apart knuckles on its free end, the knuckle on said tape being adapted to be received by the space between said knuckles on said strip, a pin passing through said knuckles, and resilient means for maintaining said pin within said knuckles.

2. In combination, a holder, a measuring tape adapted to be coiled therein and having a knuckle on one end thereof, a resilient strip within said holder for coiling said tape and having a pair of spaced apart knuckles on its free end, the knuckle on said tape being adapted to be received by the space between said knuckles on said strip, a pin passing through said knuckles, and a spring for maintaining said pin within said knuckles, said pin being adapted to be longitudinally moved clear of one of said knuckles on said strip and said knuckle on said tape whereupon said spring automatically takes up a position in the path of longitudinal movement of said pin.

3. In combination, a holder, a measuring tape adapted to be coiled therein, a resilient strip within said holder for coiling said tape, knuckles carried by said tape and strip, and a pin supported by said strip and adapted to be moved longitudinally to a position in which it is received by said knuckles when the latter are in registry, and adapted to be moved longitudinally to a position in which it is withdrawn from the knuckle on said tape, said pin when in the latter position cooperating with said holder to prevent the loss of said strip into said holder.

4. In combination, a holder, a measuring tape adapted to be coiled therein, a resilient strip within said holder for coiling said tape, a pair of spaced apart knuckles on said strip one of which is provided with an abutment, a knuckle on said tape adapted to be received by the space between said knuckles on said strip and in registry therewith when the tape is connected to said strip, and a pin carried by said strip and adapted to have longitudinal movement into, and out of, said knuckles, said pin having a rounded shank portion upon which said knuckles may pivot, said pin also having a head adapted to engage one of the knuckles on said strip to limit the longitudinal movement of said pin in one direction, said pin having a shoulder adapted to engage said abutment to limit the longitudinal movement of said pin in the opposite direction.

FREDERICK A. VOLZ.